(12) United States Patent
Latapie et al.

(10) Patent No.: US 12,555,570 B2
(45) Date of Patent: Feb. 17, 2026

(54) SEMANTIC REASONING-BASED ENVIRONMENT LEARNING FOR ACTIVITY INSIGHTS

(71) Applicant: Cisco Technology, Inc., San Jose, CA (US)

(72) Inventors: Hugo Latapie, Long Beach, CA (US); Ozkan Kilic, Long Beach, CA (US); Adam James Lawrence, Pasadena, CA (US); Gaowen Liu, Austin, TX (US); Ramana Rao V. R. Kompella, Cupertino, CA (US); Ali Payani, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 595 days.

(21) Appl. No.: 17/538,148

(22) Filed: Nov. 30, 2021

(65) Prior Publication Data

US 2023/0169962 A1    Jun. 1, 2023

(51) Int. Cl.
| | |
|---|---|
| *G10L 15/18* | (2013.01) |
| *G10L 15/06* | (2013.01) |
| *G10L 15/24* | (2013.01) |
| *G10L 25/48* | (2013.01) |

(52) U.S. Cl.
CPC ........ *G10L 15/1815* (2013.01); *G10L 15/063* (2013.01); *G10L 15/24* (2013.01); *G10L 25/48* (2013.01)

(58) Field of Classification Search
CPC ... G10L 15/1815; G10L 15/063; G10L 15/24; G10L 25/48; G06N 3/042; G06N 5/01; G06N 5/022; G06N 5/041
See application file for complete search history.

(56) References Cited

U.S. PATENT DOCUMENTS

| | | | |
|---|---|---|---|
| 10,262,079 B1 | 4/2019 | Costabello et al. | |
| 10,394,234 B2 * | 8/2019 | Salour | G05D 1/0234 |
| 10,887,197 B2 | 1/2021 | Fenoglio et al. | |
| 10,909,462 B2 | 2/2021 | Ghose et al. | |
| 10,965,516 B2 | 3/2021 | Fenoglio et al. | |
| 2013/0262479 A1 * | 10/2013 | Liang | H04W 4/021 707/748 |
| 2016/0274586 A1 * | 9/2016 | Stubbs | G06K 7/10366 |
| 2017/0309142 A1 * | 10/2017 | Phillips | G08B 13/1672 |

(Continued)

OTHER PUBLICATIONS

Tao, Wenjin, "Human Behavior Understanding for Worker-Centered Intelligent Manufacturing", online: https://scholarsmine.mst.edu/doctoral_dissertations/2922, Doctoral Dissertations. 2922, Summer 2020, Missouri S&T Library and Learning Resources.

(Continued)

*Primary Examiner* — Michael Colucci
(74) *Attorney, Agent, or Firm* — Lee & Hayes, P.C.

(57) ABSTRACT

In one embodiment, a device identifies, using a semantic reasoning engine, activities in a location, based on sensor data obtained from a plurality of sensors deployed to the location. The device associates the activities with areas of the location in which they occurred. The device makes, using the semantic reasoning engine, an inference about a particular activity, based in part on where that activity occurred. The device raises, based on the inference, an alert regarding the particular activity.

18 Claims, 14 Drawing Sheets

(56) References Cited

U.S. PATENT DOCUMENTS

| | | | |
|---|---|---|---|
| 2019/0164110 A1 | 5/2019 | Shiraishi | |
| 2019/0174289 A1* | 6/2019 | Martin | H04W 4/90 |
| 2019/0295001 A1* | 9/2019 | Fusco | G06F 16/9024 |
| 2020/0223635 A1* | 7/2020 | Govindaswamy | B65G 1/1375 |
| 2021/0042532 A1 | 2/2021 | Latapie et al. | |
| 2021/0046650 A1* | 2/2021 | Deyle | G05D 1/0214 |
| 2021/0097788 A1* | 4/2021 | Woo | G08B 13/1654 |
| 2021/0174155 A1* | 6/2021 | Smith | G06F 18/211 |
| 2021/0177307 A1 | 6/2021 | Song et al. | |
| 2021/0279615 A1 | 9/2021 | Latapie et al. | |
| 2021/0390423 A1 | 12/2021 | Latapie et al. | |
| 2022/0237530 A1* | 7/2022 | Franey | G06Q 10/047 |

OTHER PUBLICATIONS

Laadan, et al., "Using Data Mining for Infrastructure and Safety Violations Discovery in Cities", online: https://arxiv.org/pdf/2007.08630.pdf, Jul. 16, 2020, 7 pages, arXiv.org.

Thomopoulos, Stelios C. A., "Risk Assessment and Automated Anomaly DetectionUsing a Deep Learning Architecture", online: https://www.intechopen.com/chapters/75329, 2020, 30 pages, IntechOpen.

Patel, et al., "Video Representation and Suspicious Event Detection Using Semantic Technologies", online: http://semantic-web-journal.net/system/files/swj2427.pdf, Semantic Web 0, Sep. 10, 2020, accessed Aug. 9, 2021, 25 pages, IOS Press.

Agrawal, et al., "VQA: Visual Question Answering", Proceedings of the IEEE International Conference on Computer Vision (ICCV), 2015, 25 pages, arXiv:1505.00468v7 [cs.CL].

Aleksander, Igor, "Machine consciousness" In Scholarpedia. 3(2):4162, Oct. 21, 2011, 7 pages.

Anderson, et al., "Bottom-Up and Top-Down Attention for Image Captioning and Visual Question Answering", 2018 IEEE/CVF Conference on Computer Vision and Pattern Recognition, Jun. 2018, pp. 6077-6086, IEEE, Salt Lake City, Utah.

Baz, et al., "Context-aware hybrid classification system for fine-grained retail product recognition", 2016 IEEE 12th Image, Video, and Multidimensional Signal Processing Workshop (IVMSP), Jul. 2016, 5 pages, IEEE, Bordeaux, France.

Bělohlávek, Radim, "Concept lattices and order in fuzzy logic", Annals of Pure and Applied Logic 128 (2004) 277-298, Elsevier.

Box, G. E. P., "Science and Statistics", In Journal of the American Statistical Association, 71(356), Dec. 1976, pp. 791-799.

Chella, et al., "A cognitive framework for imitation learning", Robotics and Autonomous Systems 54, Mar. 2006, pp. 403-408, Elsevier.

Chella, et al., "Artificial Consciousness", Chapter 20, In Perception-Action Cycle, 2011, pp. 637-671, Springer, New York.

Chella, et al., "Machine Consciousness: a Manifesto for Robotics", In International Journal of Machine Consciousness, 1(1), Jun. 2009, pp. 33-51, World Scientific Publishing Company.

Cohen, Paul R., "Projections as Concepts", Computer Science Department Faculty Publication Series (194), https://scholarworks.umass.edu/cs/_faculty/_pubs/194, 1997, 6 pages, University of Massachusetts, Amherst.

Cui, et al., "A survey on network embedding", IEEE Transactions on Knowledge and Data Engineering, vol. 31, Issue: 5, May 1, 2019, pp. 833-852, IEEE.

Duntsch, et al., "Modal-style operators in qualitative data analysis", 2002 IEEE International Conference on Data Mining, 2002. Proceedings, Dec. 2002, pp. 155-162, IEEE, Maebashi City, Japan.

Franco, et al., "Grocery product detection and recognition", Expert Systems With Applications 81 (2017), pp. 163-176, Elsevier Ltd.

George, et al., "Recognizing Products: a Per-exemplar Multi-label Image Classification Approach", ECCV 2014, Part II, LNCS 8690, 2014, pp. 440-455, Springer International Publishing Switzerland.

Goertzel, Ben, "OpenCogPrime: a Cognitive Synergy Based Architecture for Artificial General Intelligence", 2009 8th IEEE International Conference on Cognitive Informatics, Jun. 2009, pp. 60-68, IEEE, Hong Kong, China.

Goertzel, et al., "CogPrime Architecture for Embodied Artificial General Intelligence", 2013 IEEE Symposium on Computational Intelligence for Human-like Intelligence (CIHLI), Apr. 2013, pp. 60-67, IEEE, Singapore.

Gorban, et al., "Blessing of dimensionality: mathematical foundations of the statistical physics of data", Philosophical Transactions of the Royal Society A: Mathematical, Physical and Engineering Sciences, 376.2118, Jan. 2008, 18 pages, The Royal Society Publishing.

Grover, et al., "node2vec: Scalable Feature Learning for Networks", KDD '16: Proceedings of the 22nd ACM SIGKDD International Conference on Knowledge Discovery and Data Mining, Aug. 2016, pp. 855-864, Association for Computing Machinery, New York, NY.

Hamilton, et al., "Representation Learning on Graphs: Methods and Applications", Bulletin of the IEEE Computer Society Technical Committee on Data Engineering, 2017, 23 pages, IEEE.

Hammer, et al., "A Reasoning Based Model for Anomaly Detection in the Smart City Domain", IntelliSys 2020, AISC 1251, pp. 144-159, 2021, Springer Nature Switzerland AG.

Hobbs, Jerry R., "Granularity", In Proceedings of the Ninth International Joint Conference on Artificial Intelligence, 1985, pp. 432-435, Morgan Kaufmann.

Horowitz, Alexandra, "Smelling themselves: Dogs investigate their own odours longer when modified in an "olfactory mirror" test", Behavioural Processes, 2017, 41 pages.

Kiryati, et al., "A probabilistic Hough transform", Pattern Recognition. 24(4), 1991, pp. 303-316, The Pattern Recognition Society.

Korzybski, Alfred, "Videos—This Is Not That", online: https://www.thisisnotthat.com/korzybski-videos/, accessed Nov. 18, 2021, 7 pages.

Latapie, et al., "A Metamodel and Framework for Artificial General Intelligence From Theory to Practice", Journal of Artificial Intelligence and Consciousness, Feb. 12, 2021, 1:30, 24 pages, World Scientific Publishing Company.

Li, et al., "Concept learning via granular computing: a cognitive viewpoint", Information Sciences 298 (2015), Published Dec. 2014, pp. 447-467, Elsevier Inc.

Lieto, et al., "Conceptual Spaces for Cognitive Architectures: a Lingua Franca for Different Levels of Representation", Biologically Inspired Cognitive Architectures 19, May 2017, 17 pages, Cognitive Robotics and Social Sensing Lab.

Ma, et al., "Granular computing and Dual Galois Connection", Information Sciences, 177(23), 2007, pp. 5365-5377, Elsevier Inc.

Macaulay, Thomas, "Facebook's chief AI scientist says GPT-3 is 'not a very good' Q&A system", online: https://thenextweb.com/news/facebooks-yann-lecun-says-gpt-3-is-not-very-good-as-a-qa-or-dialog-system, Oct. 28, 2020, accessed Nov. 18, 2021, 3 pages.

Murahari, et la., "Improving Generative Visual Dialog by Answering Diverse Questions", Proceedings of the 2019 Conference on Empirical Methods in Natural Language Processing and the 9th International Joint Conference on Natural Language Processing, Nov. 2018, pp. 1449-1454, Association for Computational Linguistics, Hong Kong, China.

Pauli, Wolfgang, "Part I. General: (A) theory. Some relations between electrochemical behaviour and the structure of colloids", Jan. 1935, pp. 11-27, Transactions of the Faraday Society, vol. 1.

Scarselli, et al., "The Graph Neural Network Model", IEEE Transactions on Neural Networks ( vol. 20, Issue: 1, Jan. 2009), pp. 61-80, IEEE.

Speer, et al., "ConceptNet 5.5: an Open Multilingual Graph of General Knowledge", online: https://arxiv.org/pdf/1612.03975.pdf, 2017, 9 pagers, Association for the Advancement of Artificial Intelligence.

Swanson, Bret, "The Exponential Internet", online: https://www.uschamberfoundation.org/bhq/exponential-internet, accessed Nov. 19, 2021, 8 pages, The U.S. Chamber of Commerce Foundation.

Tan, et al., "EfficientDet: Scalable and Efficient Object Detection", online: https://arxiv.org/pdf/1911.09070.pdf, Jul. 2020, 10 pages.

Taylor, J. G., "CODAM: a neural network model of consciousness", Neural Networks 20 (2007), pp. 983-992, Elsevier Ltd.

Thórisson, et al., "Cumulative Learning", Artificial General Intelligence—12th International Conference, AGI 2019, Proceedings, pp. 198-208, Springer.

(56) References Cited

OTHER PUBLICATIONS

Thórisson, Kristinn R., "A New Constructivist AI: From Manual Methods to Self-Constructive Systems", Chapter 9, Apr. 2012, pp. 147-174, Atlantis Press Book.

Thórisson, Kristinn R., "Integrated AI Systems", Minds & Machines 17, Mar. 2007, pp. 11-25.

Toninoi, et al., "Product recognition in store shelves as a sub-graph isomorphism problem", online: https://arxiv.org/abs/1707.08378, Sep. 2017, 14 pages.

Baudrillard, Jean, "Simulacra and Simulation", 1981, 159 pages, Galilee.

Chalmers, David J., "The Conscious Mind: In Search of a Fundamental Theory", 1996, 433 pages, Oxford University Press, New York.

De Bono, Edward, "The Mechanism of Mind", 1967, 276 pages, Penguin Books.

Gärdenfors, Peter, "Conceptual Spaces: The Geometry of Thought", 2000, 398 pages, MIT Press.

Johnson, Mark, "The Body in The Mind", 1987, 268 pages, The University of Chicago Press.

Korzybski, Alfred, "Manhood of Humanity, The Science and Art of Human Engineering", 1921, 240 pages, E. P. Dutton & Company, New York, NY.

Korzybski, Alfred, "Science and Sanity: an Introduction to Non-Aristotelian Systems and General Semantics", 5th Edition, 1994, 910 pages, Institute of General Semantics, New York, NY.

Lakoff, G., "Women, Fire, and Dangerous Things", 1984, 631 pages, University of Chicago Press.

Searle, John R., "The Rediscovery of the Mind", 1992, 104 pages, MIT Press.

Taylor, J. G., "William James on Consciousness Beyond the Margin", 1996, 231 pages, Princeton University Press.

Unger, et al., "The Singular Universe and the Reality of Time: a Proposal in Natural Philosophy", 2015, 558 pages, Cambridge University Press.

Unger, R. M. 2014. "Roberto Unger: Free Classical Social Theory from Illusions of False Necessity", Online Lecture. 45 pages Retrieved on Nov. 22, 2021 from https://www.youtube.com/watch?v=yYOOwNRFTcY.

Wang, et al., "Concept Analysis via Rough Set and AFS Algebra", Information Sciences 178 (2008), pp. 4125-4137, Elsevier Inc.

Wang, Pei, "Experience-grounded semantics: a theory for intelligent systems", Aug. 2004, 33 pages, Elsevier Science.

Wang, Pei, "Insufficient Knowledge and Resources—A Biological Constraint and Its Functional Implications", Biologically Inspired Cognitive Architectures II: Papers from the AAAI Fall Symposium (FS-09-01), 2009, pp. 188-193, Association for the Advancement of Artificial Intelligence (www.aaai.org).

Wang, Pei, "Non-axiomatic logic (nal) specification", online: http://citeseerx.ist.psu.edu/viewdoc/download?doi=10.1.1.167.2069&rep=rep1&type=pdf, Oct. 2009, 88 pages.

Wang, Pei, "On Defining Artificial Intelligence", Journal of Artificial General Intelligence 10(2) 2019, pp. 1-37, Sciendo.

Wang, Pei, "Rigid Flexibility—The Logic of Intelligence", Draft for Comment, Feb. 8, 2004, 329 pages, mindspring.com.

Wang, et al. "Self in NARS, an AGI System", vol. 5, Article 20, Mar. 2018, 15 pages, Frontiers in Robotics and AI.

Wang, et al., "SuperGLUE: a Stickier Benchmark for General-Purpose Language Understanding Systems", online: https://arxiv.org/pdf/1905.00537.pdf, 2019, 29 pages, 33rd Conference on Neural Information Processing Systems (NeurIPS 2019), Vancouver, Canada.

Wikipedia, "Wheat and chessboard problem", online: https://en.wikipedia.org/wiki/Wheat_and_chessboard_problem, Oct. 2021, 5 pages, Wikimedia Foundation, Inc.

Wille, Rudolf, "Restructuring Lattice Theory: an Approach Based on Heirarchies of Concepts", I. Rival (Ed.), Ordered Sets, 1982, pp. 314-339.

Yao, et al., " A Granular Computing Paradigm for Concept Learning", Emerging Paradigms in Machine Learning, Springer, London, pp. 307-326, 2012.

Yao, Y. Y., "Information Granulation and Rough Set Approximation", International Journal of Intelligent Systems, vol. 16, No. 1, 87-104, 2001.

Yao, Y. Y., "Integrative levels of granularity", Human-Centric Information Processing Through Granular Modelling, 2009, 20 pages, Studies in Computational Intelligence, vol. 182. Springer, Berlin, Heidelberg.

Ying, et al., "Graph convolutional neural networks for web-scale recommender systems", online: https://arxiv.org/pdf/1806.01973.pdf, In KDD '18: The 24th ACM SIGKDD International Conference on Knowledge Discovery & Data Mining, Aug. 19-23, 2018, London, United Kingdom. ACM, New York, NY, USA, 10 pages.

Zhou, et al., "Graph neural networks: a review of methods and applications", AI Open, 2020, pp. 57-81, Elsevier B.V.

Zhu, et al., "Describing Unseen Videos via Multi-modal Cooperative Dialog Agents" Computer Vision—ECCV 2020, 17 pages, Lecture Notes in Computer Science, vol. 12368. Springer.

* cited by examiner

SEMANTIC REASONING-BASED ENVIRONMENT LEARNING FOR ACTIVITY INSIGHTS

TECHNICAL FIELD

The present disclosure relates generally to computer networks, and, more particularly, to semantic reasoning-based environmental learning for activity insights.

BACKGROUND

The activities of people often differ by location, making it difficult to distinguish between dangerous or prohibited activities from routine activities. For instance, in an industrial manufacturing facility, a worker eating a sandwich in a break room may be completely routine and expected. However, the same worker eating a sandwich in a clean room might constitute a major health or safety violation.

From a learning standpoint, this makes identifying activities that should be reported quite challenging, as the behaviors need to be learned relative to different location contexts. Indeed, even within the same room, the criticality of certain behaviors can change. For instance, certain activity in close proximity to moving equipment can be very dangerous, whereas that same activity may be completely benign several feet away.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
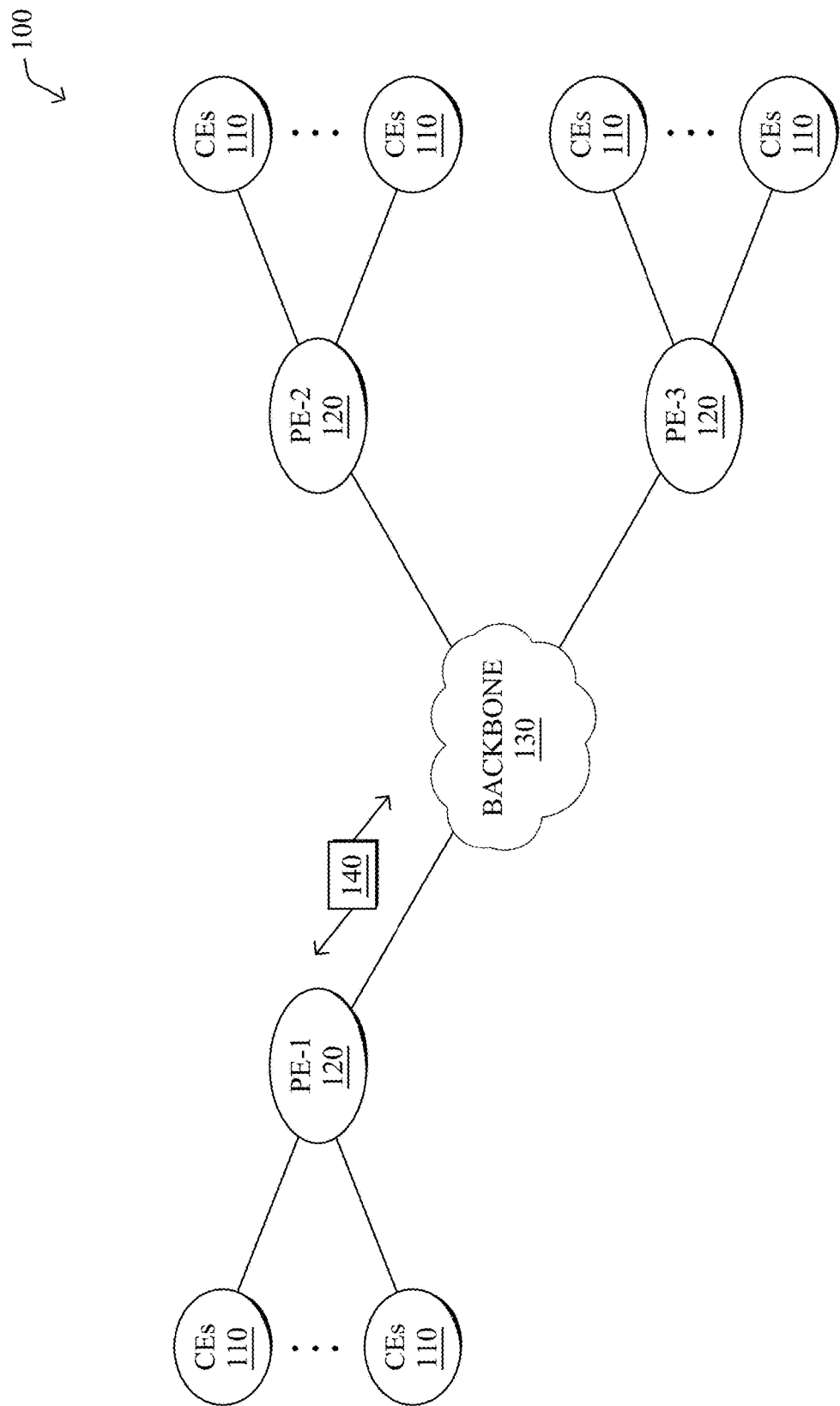
FIGS. 1A-1B illustrate an example computer network.

According to one or more embodiments of the disclosure, a device identifies, using a semantic reasoning engine, activities in a location, based on sensor data obtained from a plurality of sensors deployed to the location. The device associates the activities with areas of the location in which they occurred. The device makes, using the semantic reasoning engine, an inference about a particular activity, based in part on where that activity occurred. The device raises, based on the inference, an alert regarding the particular activity.

Description

A computer network is a geographically distributed collection of nodes interconnected by communication links and segments for transporting data between end nodes, such as personal computers, cellular phones, workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to forward data from one network to another.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN utilizing a Service Provider network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers) using a single CE router, with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
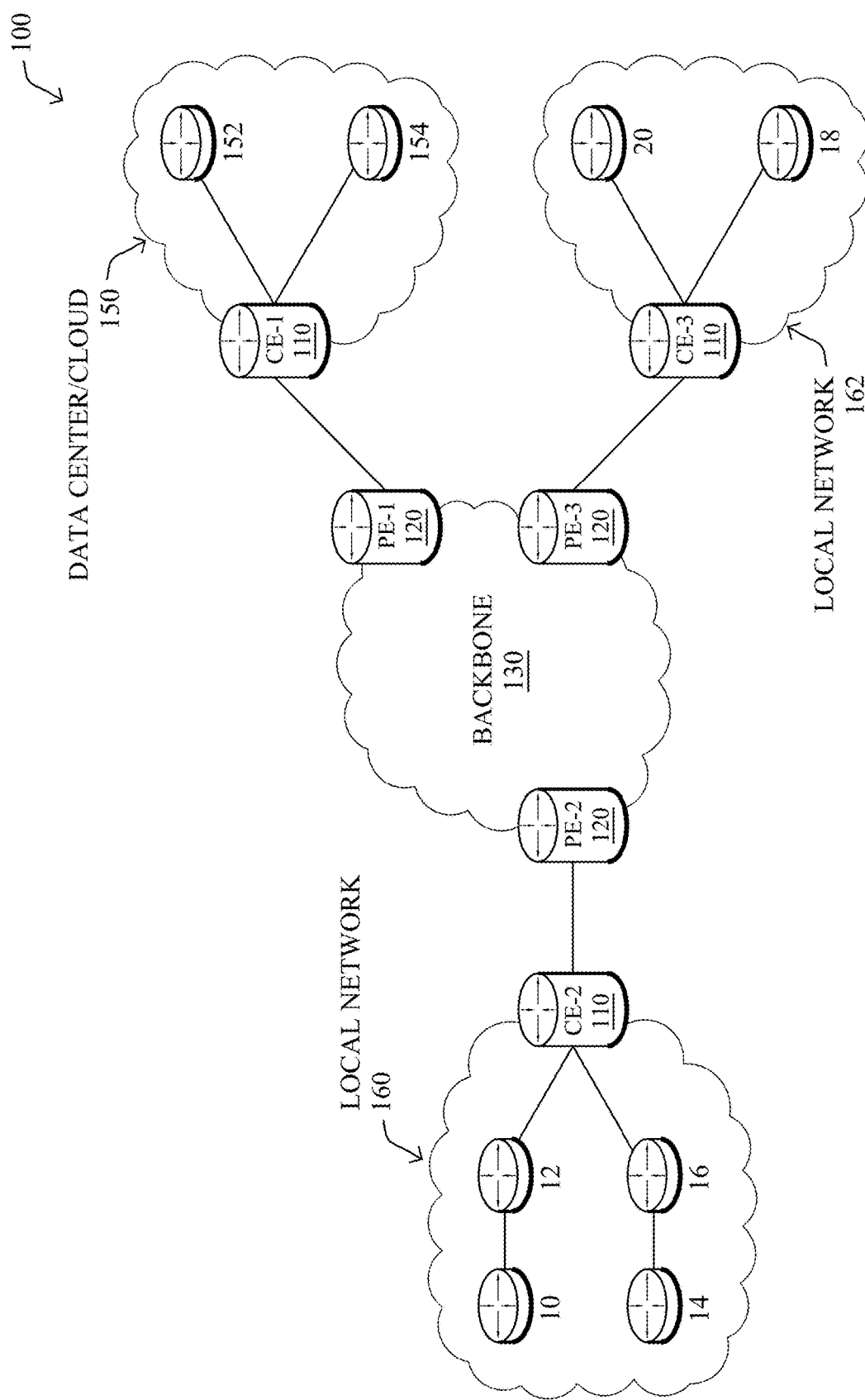

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often deployed on what are referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for devices/nodes 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
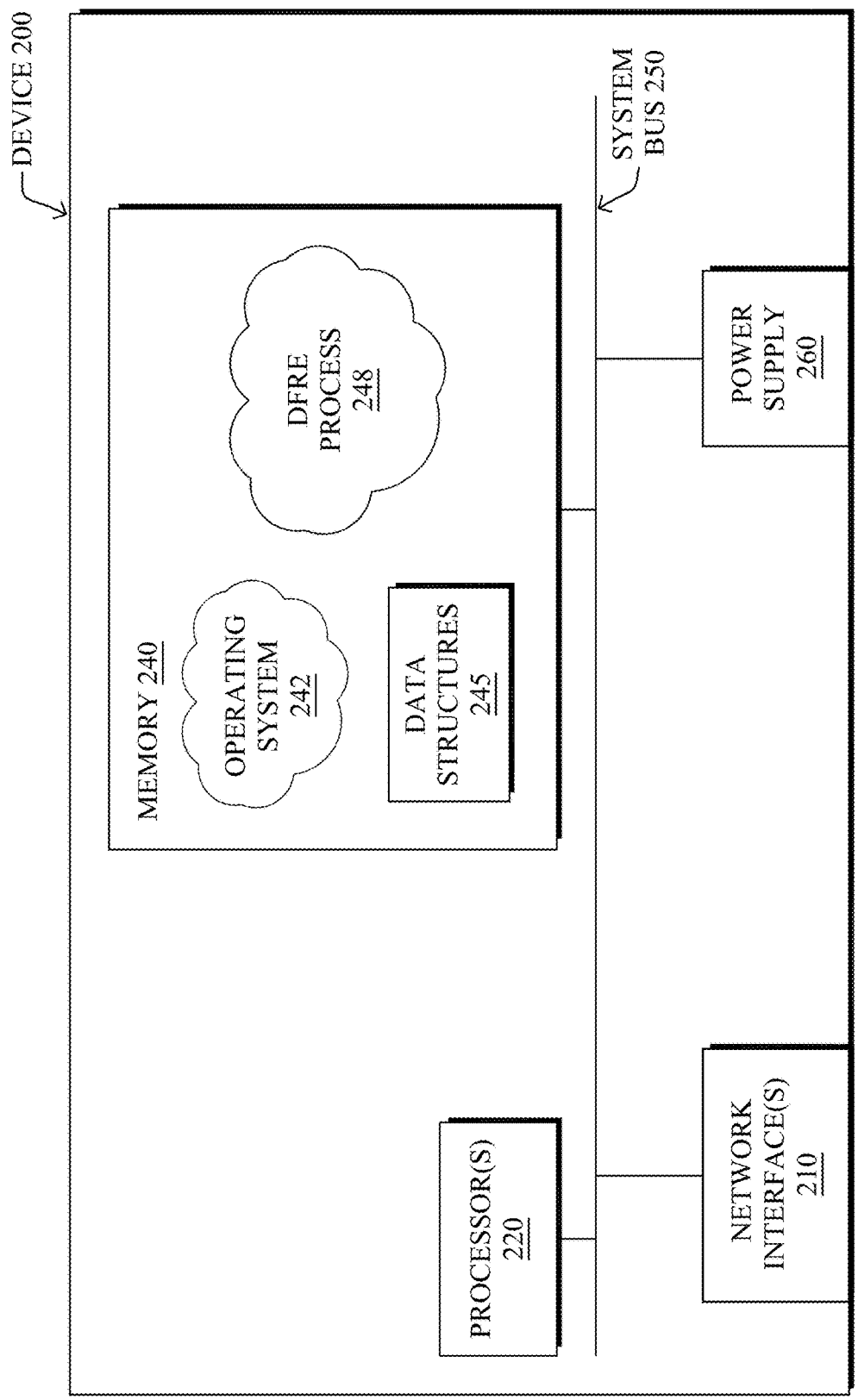
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a deep fusion reasoning engine (DFRE) process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

DFRE process 248 includes computer executable instructions that, when executed by processor(s) 220, cause device 200 to provide cognitive reasoning services to a network. In various embodiments, DFRE process 248 may utilize machine learning techniques, in whole or in part, to perform its analysis and reasoning functions. In general, machine learning is concerned with the design and the development of techniques that take as input empirical data (such as network statistics and performance indicators) and recognize complex patterns in these data. One very common pattern among machine learning techniques is the use of an underlying model M, whose hyper-parameters are optimized for minimizing the cost function associated to M, given the input data. The learning process then operates by adjusting the hyper-parameters such that the number of misclassified points is minimal. After this optimization phase (or learning phase), the model M can be used very easily to classify new data points. Often, M is a statistical model, and the minimization of the cost function is equivalent to the maximization of the likelihood function, given the input data.

In various embodiments, DFRE process 248 may employ one or more supervised, unsupervised, or self-supervised machine learning models. Generally, supervised learning entails the use of a training large set of data, as noted above, that is used to train the model to apply labels to the input data. For example, in the case of video recognition and analysis, the training data may include sample video data that depicts a certain object and is labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Self-supervised is a representation learning approach that eliminates the pre-requisite requiring humans to label data. Self-supervised learning systems extract and use the naturally available relevant context and embedded metadata as supervisory signals. Self-supervised learning models take a middle ground approach: it is different from unsupervised learning as systems do not learn the inherent structure of data, and it is different from supervised learning as systems learn entirely without using explicitly-provided labels.

Example machine learning techniques that DFRE process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like. Accordingly, DFRE process 248 may employ deep learning, in some embodiments. Generally, deep learning is a subset of machine learning that employs ANNs with multiple layers, with a given layer extracting features or transforming the outputs of the prior layer.

The performance of a machine learning model can be evaluated in a number of ways based on the number of true positives, false positives, true negatives, and/or false negatives of the model. For example, the false positives of the model may refer to the number of times the model incorrectly identified an object or condition within a video feed. Conversely, the false negatives of the model may refer to the number of times the model failed to identify an object or condition within a video feed. True negatives and positives may refer to the number of times the model correctly determined that the object or condition was absent in the video or was present in the video, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
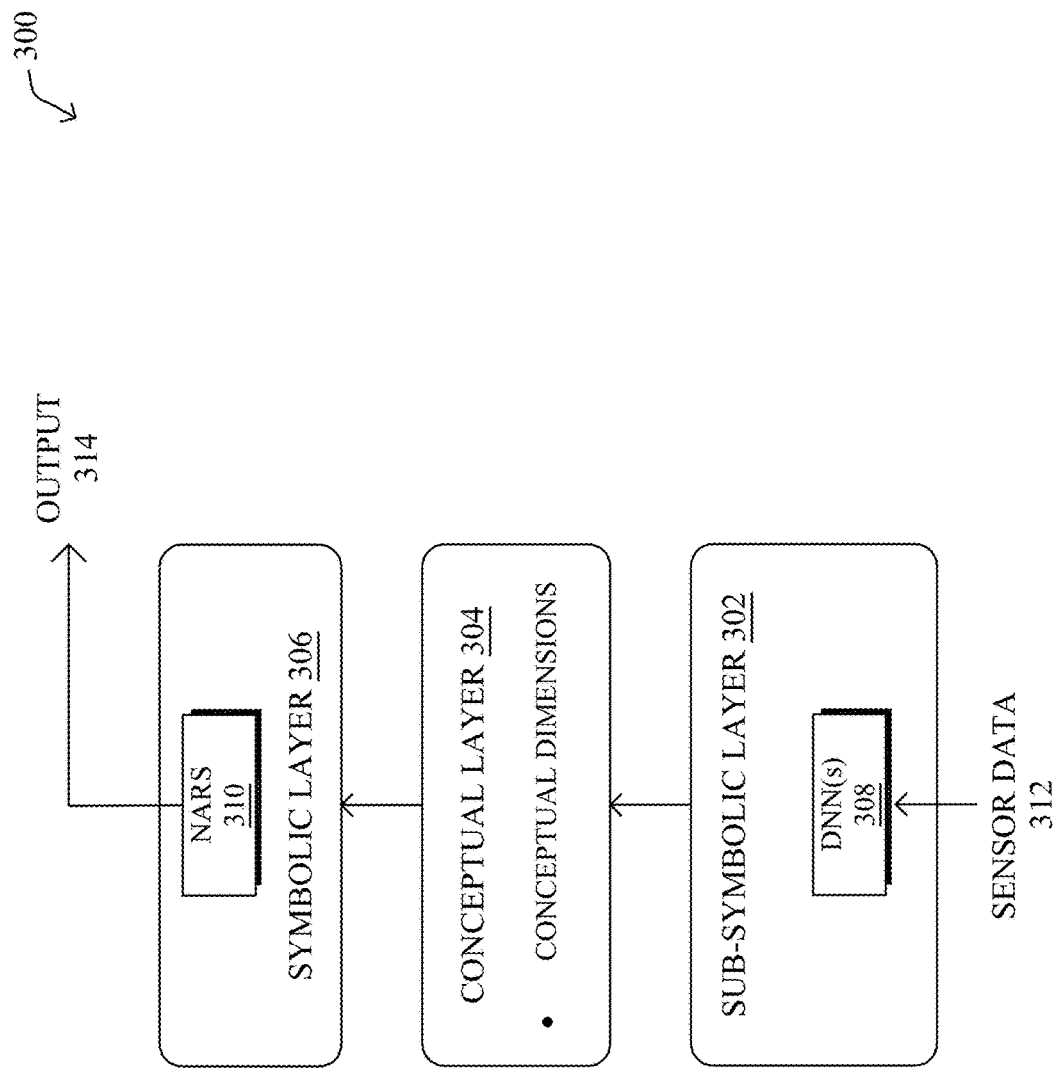
FIG. 3 illustrates an example hierarchy for a deep fusion reasoning engine (DFRE)

According to various embodiments, FIG. 3 illustrates an example hierarchy 300 for a deep fusion reasoning engine (DFRE). For example, DFRE process 248 shown in FIG. 2 may execute a DFRE for any number of purposes. In particular, DFRE process 248 may be configured to analyze sensor data in an IoT deployment (e.g., video data, etc.), to analyze networking data for purposes of network assurance, control, enforcing security policies and detecting threats, facilitating collaboration, or, as described in greater detail below, to aid in the development of a collaborative knowledge generation and learning system for visual programming.

In general, a reasoning engine, also known as a 'semantic reasoner,' 'reasoner,' or 'rules engine,' is a specialized form of machine learning software that uses asserted facts or axioms to infer consequences, logically. Typically, a reasoning engine is a form of inference engine that applies inference rules defined via an ontology language. As introduced herein, a DFRE is an enhanced form of reasoning engine that further leverages the power of sub-symbolic machine learning techniques, such as neural networks (e.g., deep learning), allowing the system to operate across the full spectrum of sub-symbolic data all the way to the symbolic level.

At the lowest layer of hierarchy 300 is sub-symbolic layer 302 that processes the sensor data 312 collected from the network. For example, sensor data 312 may include video feed/stream data from any number of cameras located throughout a location. In some embodiments, sensor data 312 may comprise multimodal sensor data from any number of different types of sensors located throughout the location. At the core of sub-symbolic layer 302 may be one or more DNNs 308 or other machine learning-based model that processes the collected sensor data 312. In other words, sub-symbolic layer 302 may perform sensor fusion on sensor data 312 to identify hidden relationships between the data.

At the opposing end of hierarchy 300 may be symbolic layer 306 that may leverage symbolic learning. In general, symbolic learning includes a set of symbolic grammar rules specifying the representation language of the system, a set of symbolic inference rules specifying the reasoning competence of the system, and a semantic theory containing the definitions of "meaning." This approach differs from other learning approaches that try to establish generalizations from facts as it is about reasoning and extracting knowledge from knowledge. It combines knowledge representations and reasoning to acquire and ground knowledge from observations in a non-axiomatic way. In other words, in sharp contrast to the sub-symbolic learning performed in layer 302, the symbolic learning and generalized intelligence performed at symbolic layer 306 requires a variety of reasoning and learning paradigms that more closely follows how humans learn and are able to explain why a particular conclusion was reached.

Symbolic learning models what are referred to as "concepts," which comprise a set of properties. Typically, these properties include an "intent" and an "extent," whereby the intent offers a symbolic way of identifying the extent of the concept. For example, consider the intent that represents motorcycles. The intent for this concept may be defined by properties such as "having two wheels" and "motorized," which can be used to identify the extent of the concept (e.g., whether a particular vehicle is a motorcycle).

Linking sub-symbolic layer 302 and symbolic layer 306 may be conceptual layer 304 that leverages conceptual spaces. In general, conceptual spaces are a proposed framework for knowledge representation by a cognitive system on the conceptual level that provides a natural way of representing similarities. Conceptual spaces enable the interaction between different type of data representations as an intermediate level between sub-symbolic and symbolic representations.

More formally, a conceptual space is a geometrical structure which is defined by a set of quality dimensions to allow for the measurement of semantic distances between instances of concepts and for the assignment of quality values to their quality dimensions, which correspond to the properties of the concepts. Thus, a point in a conceptual space S may be represented by an n-dimensional conceptual vector $v=<d_1, \ldots, d_i, \ldots, d_n>$ where $d_i$ represents the quality value for the $i^{th}$ quality dimension. For example, consider the concept of taste. A conceptual space for taste may include the following dimensions: sweet, sour, bitter, and salty, each of which may be its own dimension in the conceptual space. The taste of a given food can then be represented as a vector of these qualities in a given space (e.g., ice cream may fall farther along the sweet dimension than that of peanut butter, peanut butter may fall farther along the salty dimension than that of ice cream, etc.). By representing concepts within a geometric conceptual space, similarities can be compared in geometric terms, based on the Manhattan distance between domains or the Euclidean distance within a domain in the space. In addition, similar objects can be grouped into meaningful conceptual space regions through the application of clustering techniques, which extract concepts from data (e.g., observations).

Said differently, a conceptual space is a framework for representing information that models human-like reasoning to compose concepts using other existing concepts. Note that these representations are not competing with symbolic or associationistic representations. Rather, the three kinds can be seen as three levels of representations of cognition with different scales of resolution and complementary. Namely, a conceptual space is built up from geometrical representations based on a number of quality dimensions that complements the symbolic and deep learning models of symbolic layer 306 and sub-symbolic layer 302, representing an operational bridge between them. Each quality dimension may also include any number of attributes, which present other features of objects in a metric subspace based on their measured quality values. Here, similarity between concepts is just a matter of metric distance between them in the conceptual space in which they are embedded.

In other words, a conceptual space is a geometrical representation which allows the discovery of regions that are physically or functionally linked to each other and to abstract symbols used in symbolic layer 306, allowing for the discovery of correlations shared by the conceptual domains during concepts formation. For example, an alert prioritization module may use connectivity to directly acquire and evaluate alerts as evidence. Possible enhancements may include using volume of alerts and novelty of adjacent (spatially/temporally) alerts, to tune level of alertness.

In general, the conceptual space at conceptual layer 304 allows for the discovery of regions that are naturally linked to abstract symbols used in symbolic layer 306. The overall model is bi-directional as it is planned for predictions and action prescriptions depending on the data causing the activation in sub-symbolic layer 302.

Layer hierarchy 300 shown is particularly appealing when matched with the attention mechanism provided by a cognitive system that operates under the assumption of limited resources and time-constraints. For practical applications, the reasoning logic in symbolic layer 306 may be non-axiomatic and constructed around the assumption of insufficient knowledge and resources (AIKR). It may be implemented, for example, with a Non-Axiomatic Reasoning System (open-NARS) 310. However, other reasoning engines can also be used, such as Auto-catalytic Endogenous Reflective Architecture (AERA), OpenCog, and the like, in symbolic layer 306, in further embodiments. Even Prolog may be suitable, in some cases, to implement a reasoning engine in symbolic layer 306. In turn, an output 314 coming from symbolic layer 306 may be provided to a user interface (UI) for review. For example, output 314 may comprise a video feed/stream augmented with inferences or conclusions made by the DFRE, such as the locations of unstocked or under-stocked shelves, etc.

By way of example of symbolic reasoning, consider the ancient Greek syllogism: (1.) All men are mortal, (2.) Socrates is a man, and (3.) therefore, Socrates is mortal. Depending on the formal language used for the symbolic reasoner, these statements can be represented as symbols of a term logic. For example, the first statement can be represented as "man→[mortal]" and the second statement can be represented as "{Socrates}→man." Thus, the relationship between terms can be used by the reasoner to make inferences and arrive at a conclusion (e.g., "Socrates is mortal"). Non-axiomatic reasoning systems (NARS) generally differ from more traditional axiomatic reasoners in that the former applies a truth value to each statement, based on the amount of evidence available and observations retrieved, while the latter relies on axioms that are treated as a baseline of truth from which inferences and conclusions can be made.

In other words, a DFRE generally refers to a cognitive engine capable of taking sub-symbolic data as input (e.g., raw or processed sensor data regarding a monitored system), recognizing symbolic concepts from that data, and applying symbolic reasoning to the concepts, to draw conclusions about the monitored system.

Figure 4:
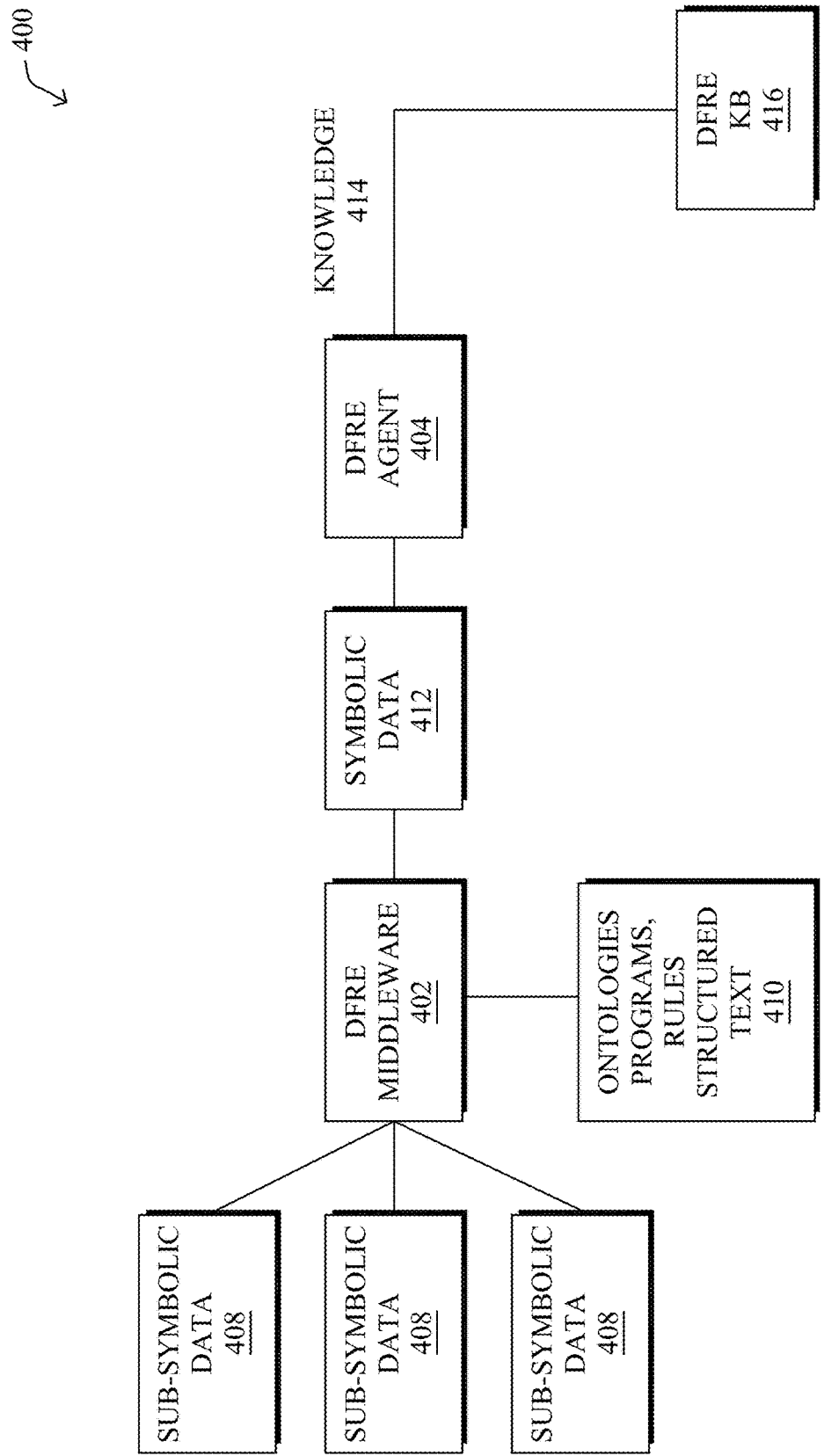
FIG. 4 illustrates an example DFRE architecture.

According to various embodiments, FIG. 4 illustrates an example DFRE architecture 400. As shown, architecture 400 may be implemented across any number of devices or fully on a particular device, as desired. At the core of architecture 400 may be DFRE middleware 402 that offers a collection of services, each of which may have its own interface. In general, DFRE middleware 402 may leverage a library for interfacing, configuring, and orchestrating each service of DFRE middleware 402.

In various embodiments, DFRE middleware 402 may also provide services to support semantic reasoning, such as by an AIKR reasoner. For example, as shown, DFRE middleware 402 may include a NARS agent that performs semantic reasoning for structural learning. In other embodiments, OpenCog or another suitable AIKR semantic reasoner could be used.

One or more DFRE agents 404 may interface with DFRE middleware 402 to orchestrate the various services available from DFRE middleware 402. In addition, DFRE agent 404 may feed and interact with the AIKR reasoner so as to populate and leverage a DFRE knowledge graph with knowledge.

More specifically, in various embodiments, DFRE middleware 402 may obtain sub-symbolic data 408. In turn, DFRE middleware 402 may leverage various ontologies, programs, rules, and/or structured text 410 to translate sub-symbolic data 408 into symbolic data 412 for consumption by DFRE agent 404. This allows DFRE agent 404 to apply symbolic reasoning to symbolic data 412, to populate and update a DFRE knowledge base (KB) 416 with knowledge 414 regarding the problem space (e.g., the network under observation, etc.). In addition, DFRE agent 404 can leverage the stored knowledge 414 in DFRE KB 416 to make assessments/inferences.

For example, DFRE agent 404 may perform semantic graph decomposition on DFRE KB 416 (e.g., a knowledge graph), so as to compute a graph from the knowledge graph of KB 416 that addresses a particular problem. DFRE agent 404 may also perform post-processing on DFRE KB 416, such as performing graph cleanup, applying deterministic rules and logic to the graph, and the like. DFRE agent 404 may further employ a definition of done, to check goals and collect answers using DFRE KB 416.

In general, DFRE KB 416 may comprise any or all of the following:
Data
Ontologies
Evolutionary steps of reasoning
Knowledge (e.g., in the form of a knowledge graph)
The Knowledge graph also allows different reasoners to:
 Have their internal subgraphs
 Share or coalesce knowledge
 Work cooperatively In other words, DFRE KB 416 acts as a dynamic and generic memory structure. In some embodiments, DFRE KB 416 may also allow different reasoners to share or coalesce knowledge, have their own internal sub-graphs, and/or work collaboratively in a distributed manner. For example, a first DFRE agent 404 may perform reasoning on a first sub-graph, a second DFRE agent 404 may perform reasoning on a second sub-graph, etc., to evaluate the health of the network and/or find solutions to any detected problems. To communicate with DFRE agent 404, DFRE KB 416 may include a bidirectional Narsese interface or other interface using another suitable grammar.

In various embodiments, DFRE KB 416 can be visualized on a user interface. For example, Cytoscape, which has its building blocks in bioinformatics and genomics, can be used to implement graph analytics and visualizations.

Said differently, DFRE architecture 400 may include any or all of the following the following components:
DFRE middleware 402 that comprises:
 Structural learning component
 JSON, textual data, ML/DL pipelines, and/or other containerized services (e.g., using Docker)
 Hierarchical goal support
DFRE Knowledge Base (KB) 416 that supports:
 Bidirectional Narseseese interface
 Semantic graph decomposition algorithms
 Graph analytics
 Visualization services
DFRE Agent 404
 DFRE Control System More specifically, in some embodiments, DFRE middleware 402 may include any or all of the following:
Subsymbolic services:
 Data services to collect sub-symbolic data for consumption
Reasoner(s) for structural learning
NARS
OpenCog
Optimized hierarchical goal execution
 Probabilistic programming
 Causal inference engines
Visualization Services (e.g., Cytoscape, etc.)
DFRE middleware 402 may also allow the addition of new services needed by different problem domains.

Figure 5:
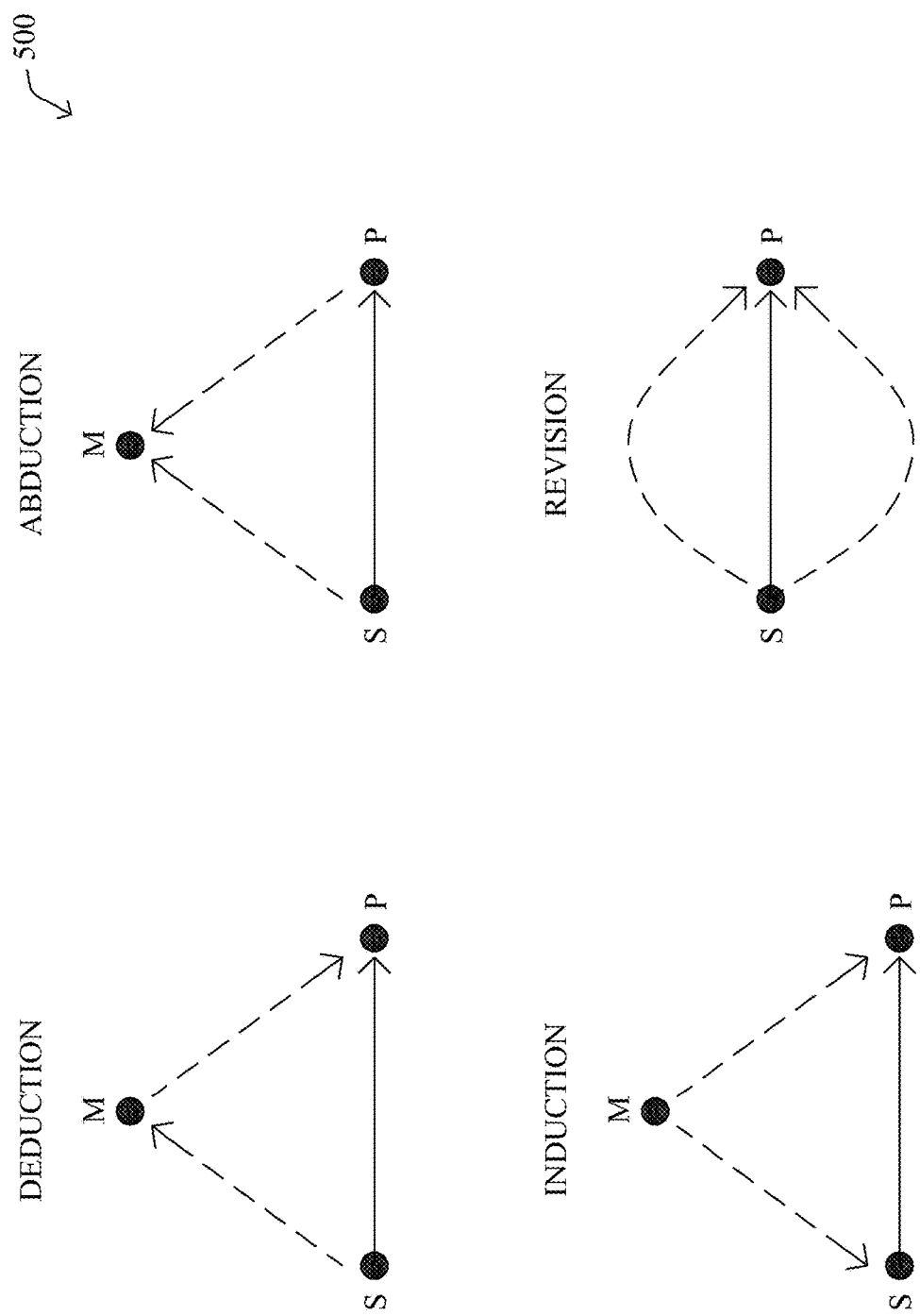
FIG. 5 illustrates an example of various inference types.
Figure 6:
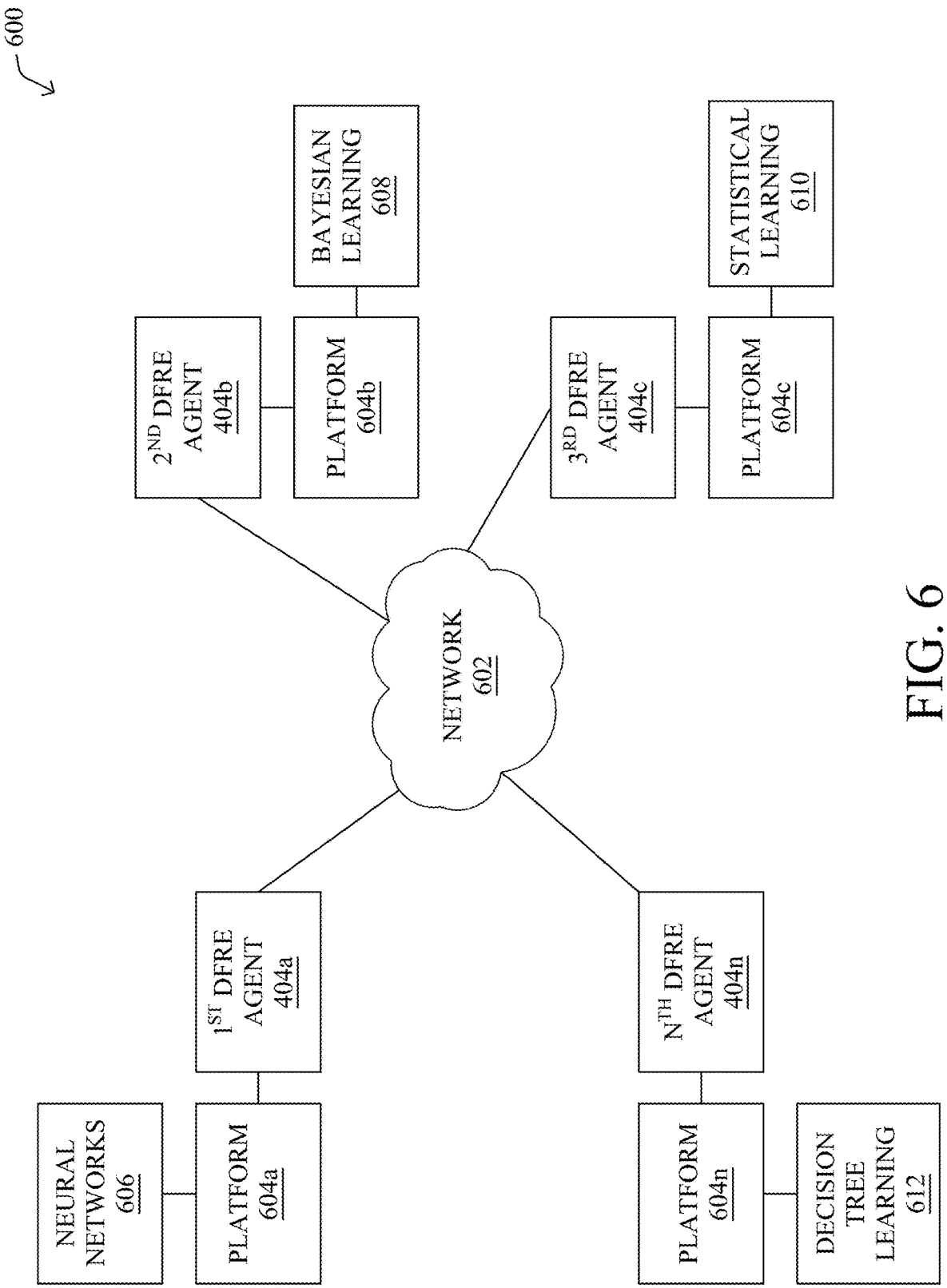
FIG. 6 illustrates an example architecture for multiple DFRE agents.

During execution, DFRE agent 404 may, thus, perform any or all of the following:
Orchestration of services
Focus of attention
   Semantic graph decomposition
      Addresses combinatorial issues via an automated divide and conquer approach that works even in non-separable problems because the overall knowledge graph 416 may allow for overlap.
Feeding and interacting with the AIKR reasoner via bidirectional translation layer to the DFRE knowledge graph.
Call middleware services
Post processing of the graph
   Graph clean-up
   Apply deterministic rules and logic to the graph
Definition of Done (DoD)
   Check goals and collect answers FIG. 5 illustrates an example 500 showing the different forms of structural learning that the DFRE framework can employ. More specifically, the inference rules in example 500 relate premises S→M and M→P, leading to a conclusion S→P. Using these rules, the structural learning herein can be implemented using an ontology with respect to an Assumption of Insufficient Knowledge and Resources (AIKR) reasoning engine, as noted previously. This allows the system to rely on finite processing capacity in real time and be prepared for unexpected tasks. More specifically, as shown, the DFRE may support any or all of the following:
Syllogistic Logic
   Logical quantifiers
Various Reasoning Types
   Deduction Induction
   Abduction
   Induction
   Revision
Different Types of Inference
Local inference
Backward inference To address combinatorial explosion, the DFRE knowledge graph may be partitioned such that each partition is processed by one or more DFRE agents 404, as shown in FIG. 6, in some embodiments. More specifically, any number of DFRE agents 404 (e.g., a first DFRE agent 404a through an $N^{th}$ DFRE agent 404n) may be executed by devices connected via a network 602 or by the same device. In some embodiments, DFRE agents 404a-404n may be deployed to different platforms (e.g., platforms 604a-604n) and/or utilize different learning approaches. For instance, DFRE agent 404a may leverage neural networks 606, DFRE agent 404b may leverage Bayesian learning 608, DFRE agent 404c may leverage statistical learning, and DFRE agent 404n may leverage decision tree learning 612.

As would be appreciated, graph decomposition can be based on any or all of the following:
Spatial relations—for instance, this could include the vertical industry of a customer, physical location (country) of a network, scale of a network deployment, or the like.
Descriptive properties, such as severity, service impact, next step, etc.
Graph-based components (isolated subgraphs, minimum spanning trees, all shortest paths, strongly connected components . . . )
Any new knowledge and related reasoning steps can also be input back to the knowledge graph, in various embodiments.

In further embodiments, the DFRE framework may also support various user interface functions, so as to provide visualizations, actions, etc. to the user. To do so, the framework may leverage Cytoscape, web services, or any other suitable mechanism.

Figure 7:
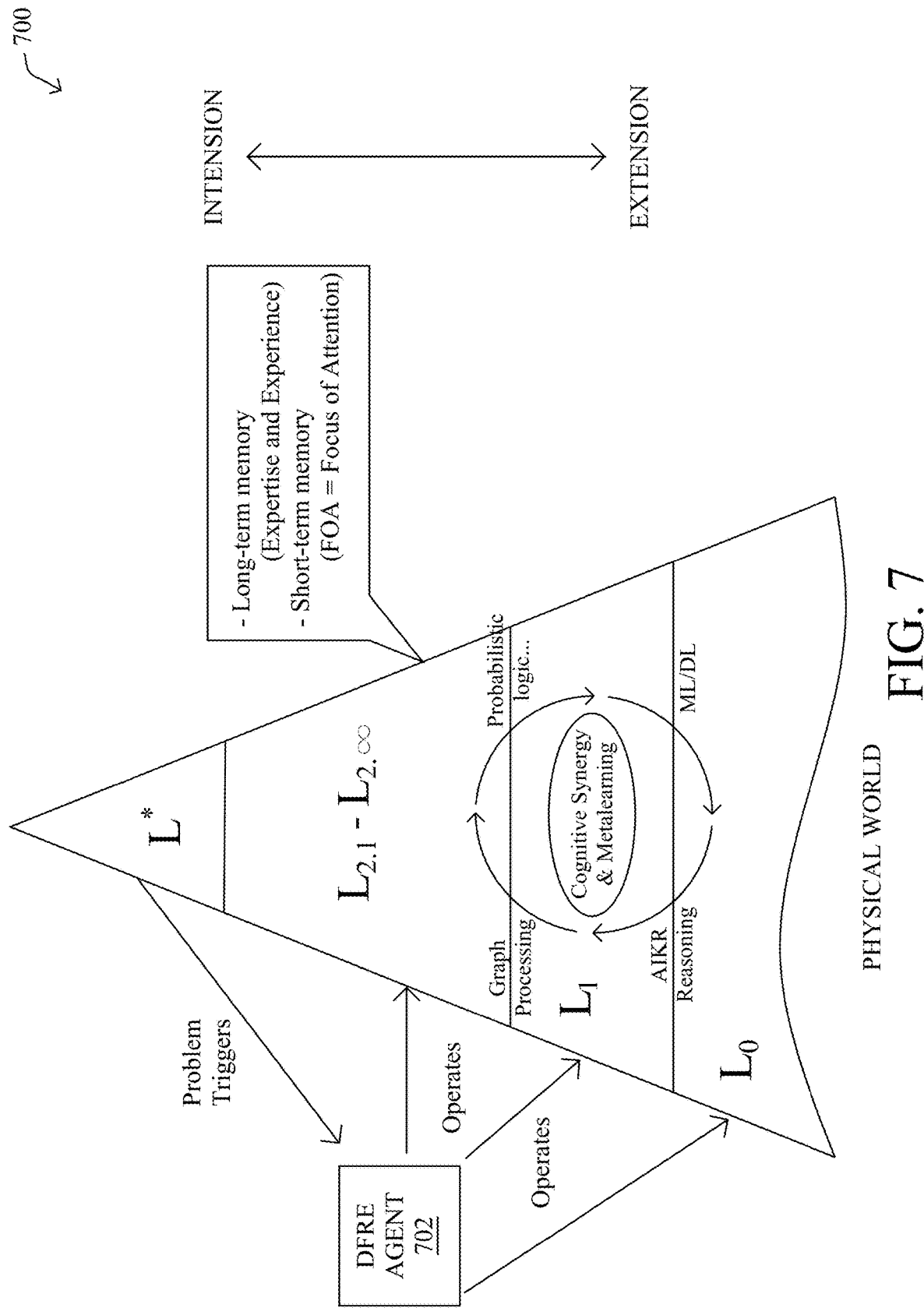
FIG. 7 illustrates an example DFRE metamodel.

At the core of the techniques herein is a knowledge representation metamodel 700 for different levels of abstraction, as shown in FIG. 7, according to various embodiments. In various embodiments, the DFRE knowledge graph groups information into four different levels, which are labeled $L_0$, $L_1$, $L_2$, and $L^*$ and represent different levels of abstraction, with $L_0$ being closest to raw data coming in from various sensors and external systems and $L_2$ representing the highest levels of abstraction typically obtained via mathematical means such as statistical learning and reasoning. $L^*$ can be viewed as the layer where high-level goals and motivations are stored. The overall structure of this knowledge is also based on anti-symmetric and symmetric relations.

One key advantage of the DFRE knowledge graph is that human level domain expertise, ontologies, and goals are entered at the $L_2$ level. This leads, by definition, to an unprecedented ability to generalize at the $L_2$ level thus minimizing the manual effort required to ingest domain expertise.

More formally:
$L^*$ represents the overall status of the abstraction. In case of a problem, it triggers problem solving in lower layers via a DFRE agent 702.
$L_{2.1}$-$L_{2.\infty}$=Higher level representations of the world in which most of concepts and relations are collapsed into simpler representations. The higher-level representations are domain-specific representations of lower levels.
$L_1$=has descriptive, teleological and structural information about $L_0$.
$L_0$=Object level is the symbolic representation of the physical world.

In various embodiments, $L_2$ may comprise both expertise and experience stored in long-term memory, as well as a focus of attention (FOA) in short-term memory. In other words, when a problem is triggered at $L^*$, a DFRE agent 702 that operates on $L_2$-$L_0$ may control the FOA so as to focus on different things, in some embodiments.

As would be appreciated, there may be hundreds of thousands or even millions of data points that need to be extracted at $L_0$. The DFRE's FOA is based on the abstraction and the DFRE knowledge graph (KG) may be used to keep combinatorial explosion under control.

Said differently, metamodel 700 may generally take the form of a knowledge graph in which semantic knowledge is stored regarding a particular system, such as a computer network and its constituent networking devices. By representing the relationships between such real-world entities (e.g., router A, router B, etc.), as well as their more abstract concepts (e.g., a networking router), DFRE agent 702 can make evaluations regarding the particular system at different levels of extraction. Indeed, metamodel 700 may differ from a more traditional knowledge graph through the inclusion of any or all of the following, in various embodiments:
A formal mechanism to represent different levels of abstraction, and for moving up and down the abstraction hierarchy (e.g., ranging from extension to intension).
Additional structure that leverages distinctions/anti-symmetric relations, as the backbone of the knowledge structures.
Similarity/symmetric relation-based relations.

As noted above, the activities of people often differ by location, making it difficult to distinguish between dangerous or prohibited activities from routine activities. For instance, in an industrial manufacturing facility, a worker eating a sandwich in a break room may be completely routine and expected. However, the same worker eating a sandwich in a clean room might constitute a major health or safety violation.

From a learning standpoint, this makes identifying activities that should be reported quite challenging, as the behaviors need to be learned relative to different location contexts. Indeed, even within the same room, the criticality of certain behaviors can change. For instance, certain activity in close proximity to moving equipment can be very dangerous, whereas that same activity may be completely benign several feet away.

Semantic Reasoning-Based Environmental Learning for Activity Insights

The techniques herein allow for the semantic learning of activities and activity patterns in different areas of a location/environment. In some embodiments, the techniques herein are able to not only identify activities occurring in different areas of the location, but also to make inferences about those activities to drive alerts, make suggestions, and/or initiate corrective measures.

Illustratively, the techniques described herein may be performed by hardware, software, and/or firmware, such as in accordance with the DFRE process 248, which may include computer executable instructions executed by the processor 220 (or independent processor of interfaces 210), to perform functions relating to the techniques described herein.

Specifically, according to various embodiments, a device identifies, using a semantic reasoning engine, activities in a location, based on sensor data obtained from a plurality of sensors deployed to the location. The device associates the activities with areas of the location in which they occurred. The device makes, using the semantic reasoning engine, an inference about a particular activity, based in part on where that activity occurred. The device raises, based on the inference, an alert regarding the particular activity.

Figure 8:
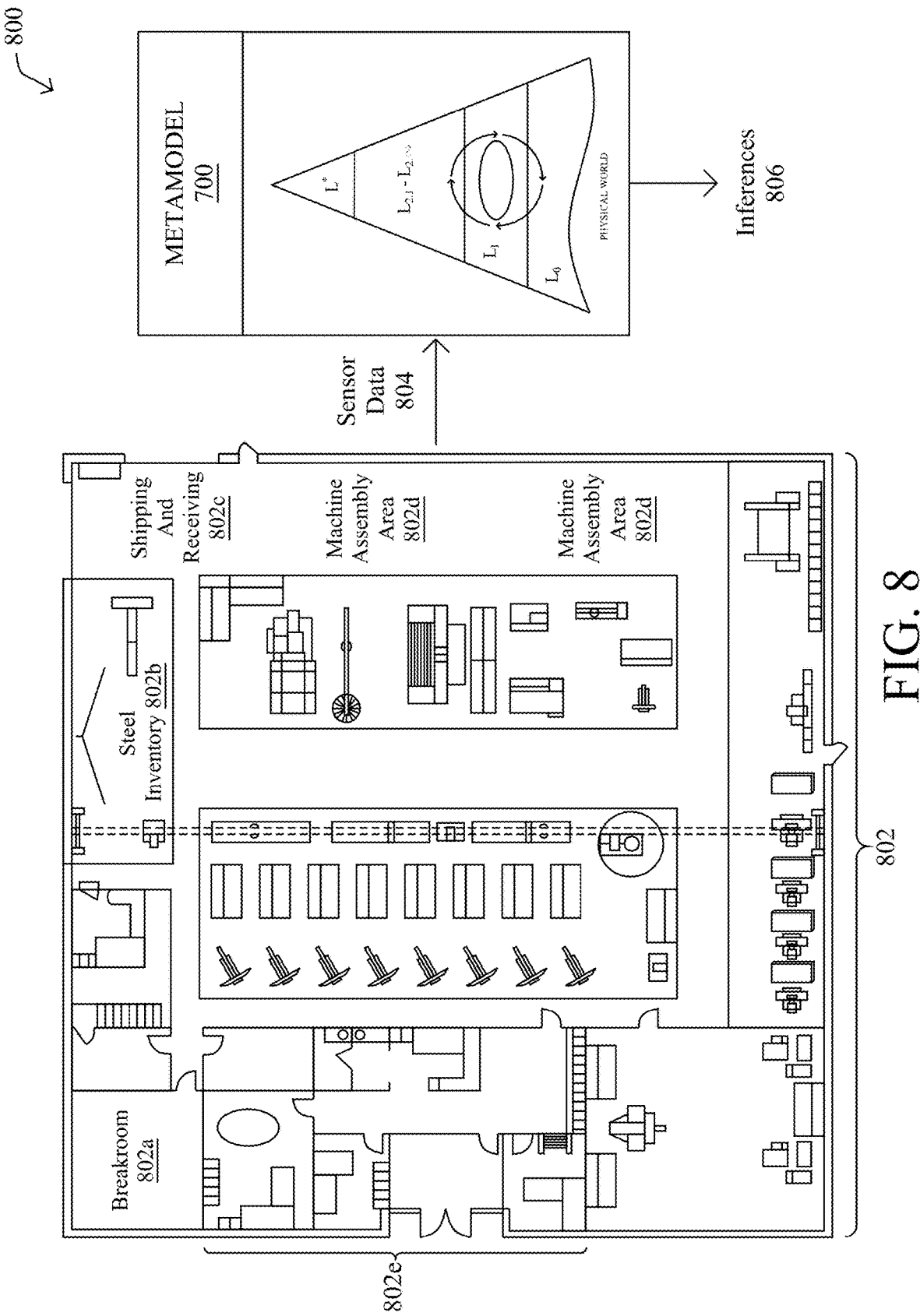
FIG. 8 illustrates an example of using a DFRE metamodel to evaluate activities in a location.

Operationally, the techniques herein propose leveraging a DFRE-based architecture to learn about a location. By way of example, FIG. 8 illustrates an example 800 of using a DFRE metamodel, such as metamodel 700, to evaluate activities in a location, such as location 802. As shown, assume that location 802 is an industrial manufacturing building having various rooms and areas. For instance, location 802 may include any or all of the following areas, among others:
a breakroom 802*a*
an inventory room 802*b*
a shipping and receiving area 802*c*
a machine and assembly area 802*d*
office space 802*e*

In various embodiments, there may be any number of sensors distributed throughout the various areas of location 802. For instance, such sensors may include, but are not limited to, vibration sensors, passive infrared (PIR) cameras, video cameras, acoustic sensors, location determining systems such as Wi-Fi, Radio Frequency Identification (RFID), etc., combinations thereof, or the like.

As shown, sensor data 804 generated by the various sensors deployed throughout location 802 may be used as input to a DFRE metamodel, such as metamodel 700, to learn about the environment and different activities present in location 802. For instance, metamodel 700 may learn about the locations and routines of robots, machines, or workers present in 802, based on 804. From this learning, metamodel 700 may generate inferences 806 regarding activities occurring in location 802 that are dependent, in part, on the areas of location 802 in which those activities occur. More specifically, 700 may maintain and update a semantic knowledge base of interrelated concepts that allows it to not only learn what these activities are (as well as where they should occur), but also to use its semantic reasoning to infer the implications of these activities (e.g., to identify safety violations, etc.), possible outcomes of these activities (e.g., a machine will eventually become damaged, a person will be hurt, etc.), and/or corrective measures (e.g., shut down a robot, alert a person, etc.).

More specifically, metamodel 700 may do any or all of the following with respect to location 802, based on sensor data 804:
Lean the layout of location 802
Learn the behaviors of robots in location 802
Learn the behaviors of other machines in location 802
Learn machine-worker interactions in location 802
Learn routines in location 802
Generate descriptions for the activities in location 802
Generate insights for the activities in location 802
Detect anomalous activities in location 802
Make predictions regarding the activities in location 802

This can be done, in various embodiments, by leveraging the prior knowledge of the metamodel about the semantics of locations, so that it can learn any or all of the above with respect to the specific location.

By way of example, consider the activity of "eating a sandwich." Such an activity may be fairly routine and benign in breakroom 802*a* or in office space 802*e*. However, when that same activity is performed within machine assembly area 802*d*, this could constitute a potential safety hazard. Based on identification of this activity by metamodel 700 from sensor data 804, as well as the areas in which the activity occurred, metamodel 700 may make its inference about the activity. Indeed, in the former case, metamodel 700 may determine that this is a benign behavior that can be ignored. However, in the latter case, the system can send an alert or take other corrective measures (e.g., by sending an alert to a mobile device of the user in machine and assembly area 802*d*, etc.).

Figure 9A:
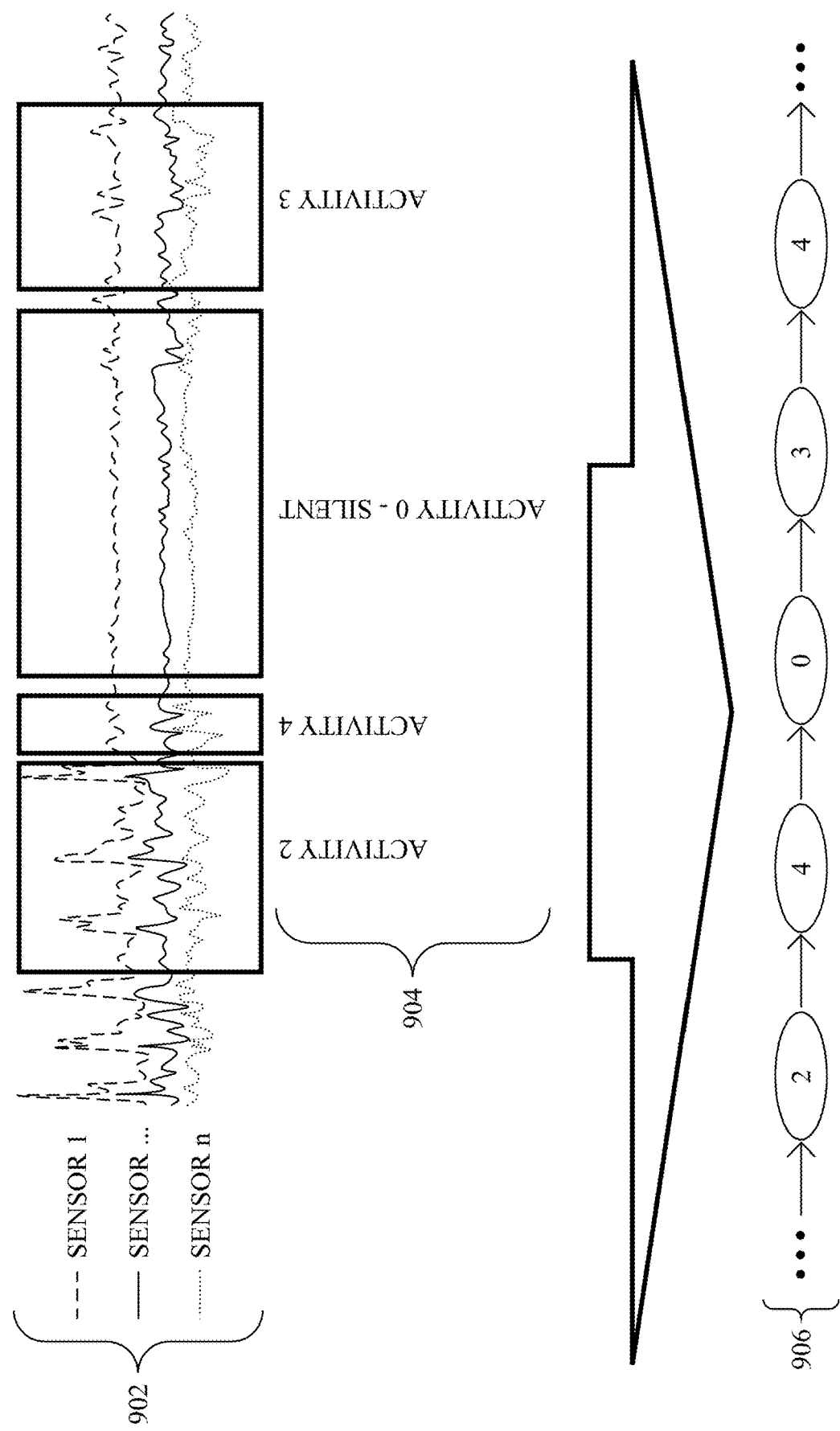
FIGS. 9A-9B illustrate examples of a DFRE metamodel identifying activities from sensor data.
Figure 9B:
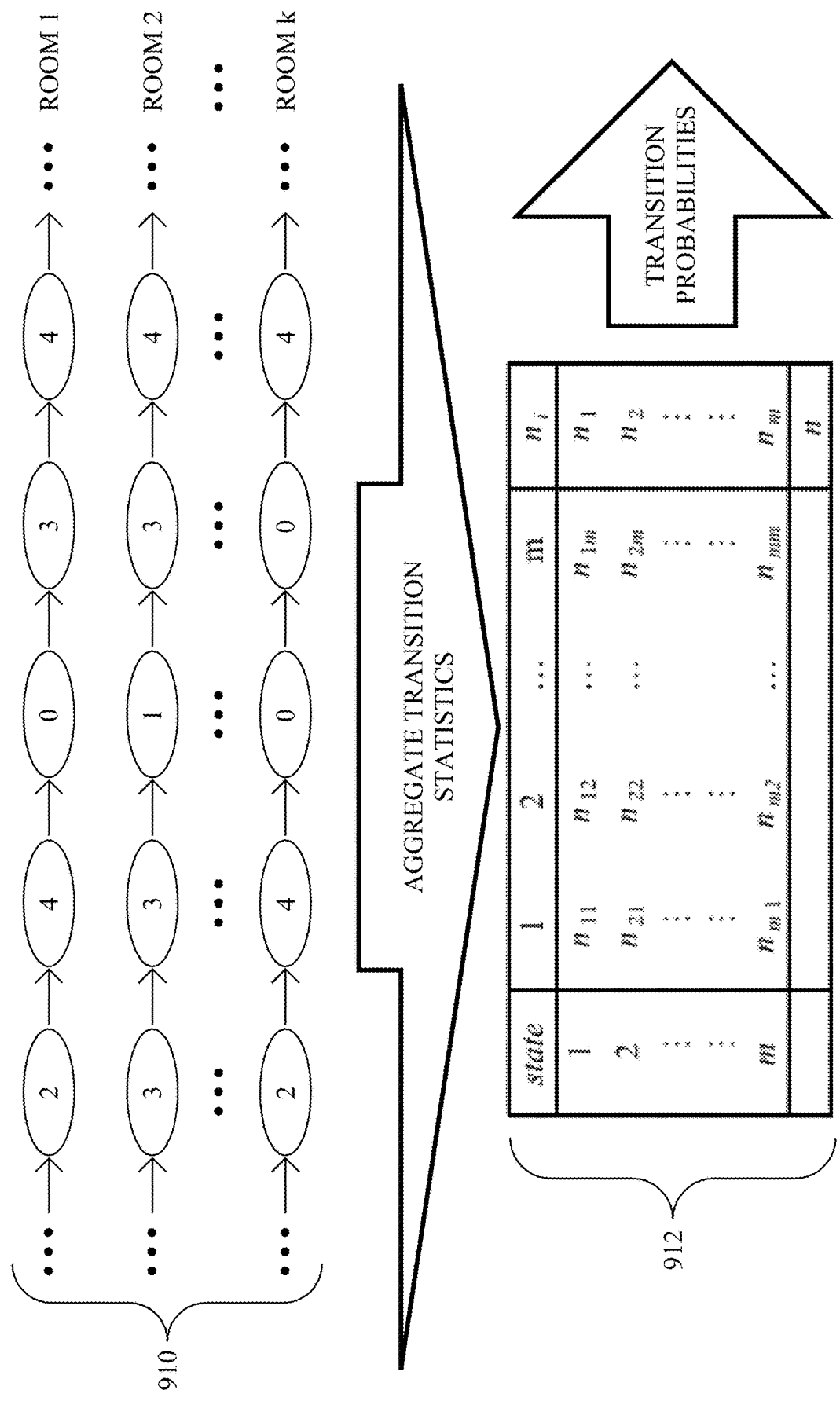

FIGS. 9A-9B illustrate examples of a DFRE metamodel identifying activities from sensor data, according to various embodiments. As shown in FIG. 9A, assume that there is a plurality of time series 902 of sensor data from a particular area of a location/environment under observation. From this, the metamodel may identify various activities 904 occurring over time in those areas. For instance, the metamodel may employ machine learning-based video analytics, multimodal sensor analysis, and the like, to identify the occurrence of a particular activity 904 in the area.

In some embodiments, the metamodel may also the temporal aspects of activities 904. For instance, the metamodel may generate one or more activity timelines 906 for the area, as an aggregate of the different types of activities identified in the area and/or for specific types of activities. Doing so allows the metamodel to also learn over time what is considered 'normal' activity in a given area versus what is 'abnormal' activity. In addition, such an activity timeline also allows the metamodel to make predictions, such as when a transition between activities will occur in the area.

FIG. 9B illustrates another example of a DFRE metamodel identifying activities from sensor data, this time across different areas, according to various embodiments. Here, assume that the system has generated activity timelines 910 for k-number of rooms of a location, such as by using the approach depicted in FIG. 9A.

In some embodiments, the DFRE metamodel may use activity timelines 910 to generate and aggregate statistics regarding the activity transitions across the various areas of the location. Indeed, certain sequences of activities may span multiple areas (e.g., rooms). By analyzing these sequences, the system can also generate state transition statistics 912 that can be used to compute the probabilities of transitions between activities across the different areas.

For instance, assume workers in location 802 from FIG. 8 typically arrive at work at 8:00 AM, begin congregating in a particular area (e.g., breakroom 802a) soon after, and begin operating equipment in machine assembly area 802d by 8:15 AM. Individually, these identified activities may be useful for purposes of driving safety alerts, learning anomalous vs. non-anomalous behaviors, and the like. However, by assessing the activities in the aggregate across different rooms, the system can also learn more complex activity patterns and make deeper inferences about the location.

In various embodiments, another feature of the DFRE metamodel is its ability to learn the concepts behind the different activities, allowing the system to not only infer the potential results of that activity, but also to initiate corrective measures, such as providing alerts to user devices and/or other devices in the location. For instance, consider the case in which there are multiple robotic arms moving within a certain section of a factory, such as machine and assembly area 802d of location 802 in FIG. 8. From vibration sensors in the area, the metamodel may identify the robotic arms as being in motion as a first activity in the area.

Now, assume that the system identifies a new activity in the area: two workers entering the space of the robots. However, there are no other workers present, such as operators of the robotic arms. Under these conditions, the system may infer that the two workers may get hurt by the movement of the robotic arms.

In the above scenario, the system may take any number of corrective measures. In one embodiment, the system may send an alert to a mobile device of the worker(s), instructing them to leave the area. Such an alert may take the form of a text message, email, pop-up message, or the like. In another embodiment, if the alerted worker(s) do not respond or leave the area, which itself could be its own category of activity (e.g., ignoring a safety alert from the system), another potential action that the system may take is to send an alert to the robotic arms themselves with a control command to shut down, immediately. Here, the system not only understands that the activities of the workers and that of the robots could present a safety hazard, but also understand how to implement corrective measures at both the worker level (e.g., by sending an alert to them) and at the robot level (e.g., by shutting down the robots).

Figure 10:
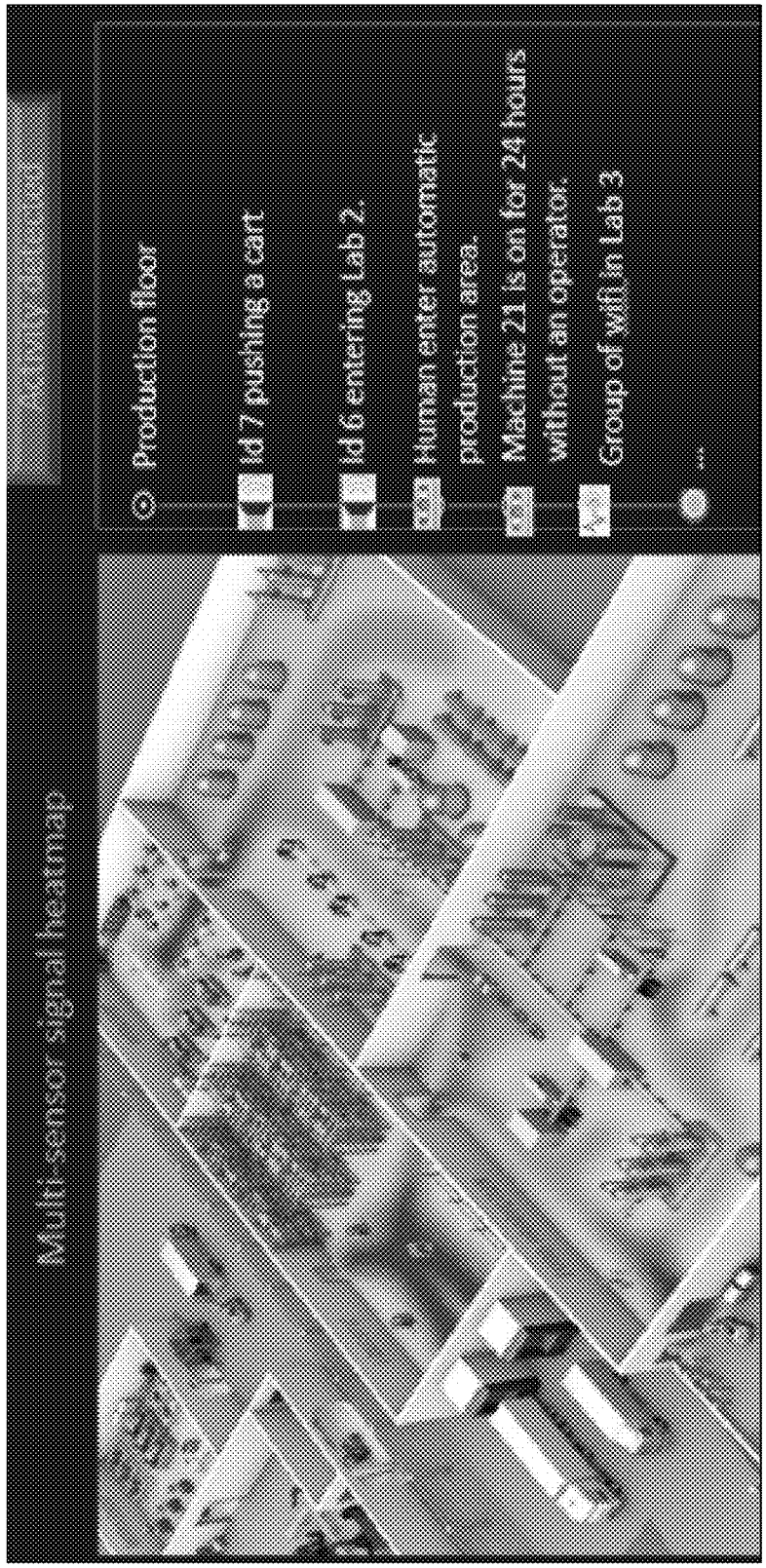
FIG. 10 illustrates an example user interface depicting an activity heatmap.

Beyond simply detecting safety violations, other forms of insights that could also be provided by the system. For instance, the system may display its learned activity heatmaps, activity timelines, etc., to allow an operator to gain a better understanding of how the environment functions over time. FIG. 10 illustrates an example user interface 1000 depicting an activity heatmap, according to various embodiments.

As shown in FIG. 10, the system may provide various alert information for display via user interface 1000, such as a heatmap 1002 of one or more types of activities, an activity timeline 1004, or the like. Here, heatmap 1002 may show precisely where in the various areas of a location a certain activity tends to occur, such as the movement of people throughout the location. In more complex cases, heatmap 1002 may have a temporal component to it (e.g., for a certain time period) and/or may represent a set or sequence of activities. For instance, one potential heatmap may be for the transition from activity A to activity B to activity C, sequentially.

Figure 11:
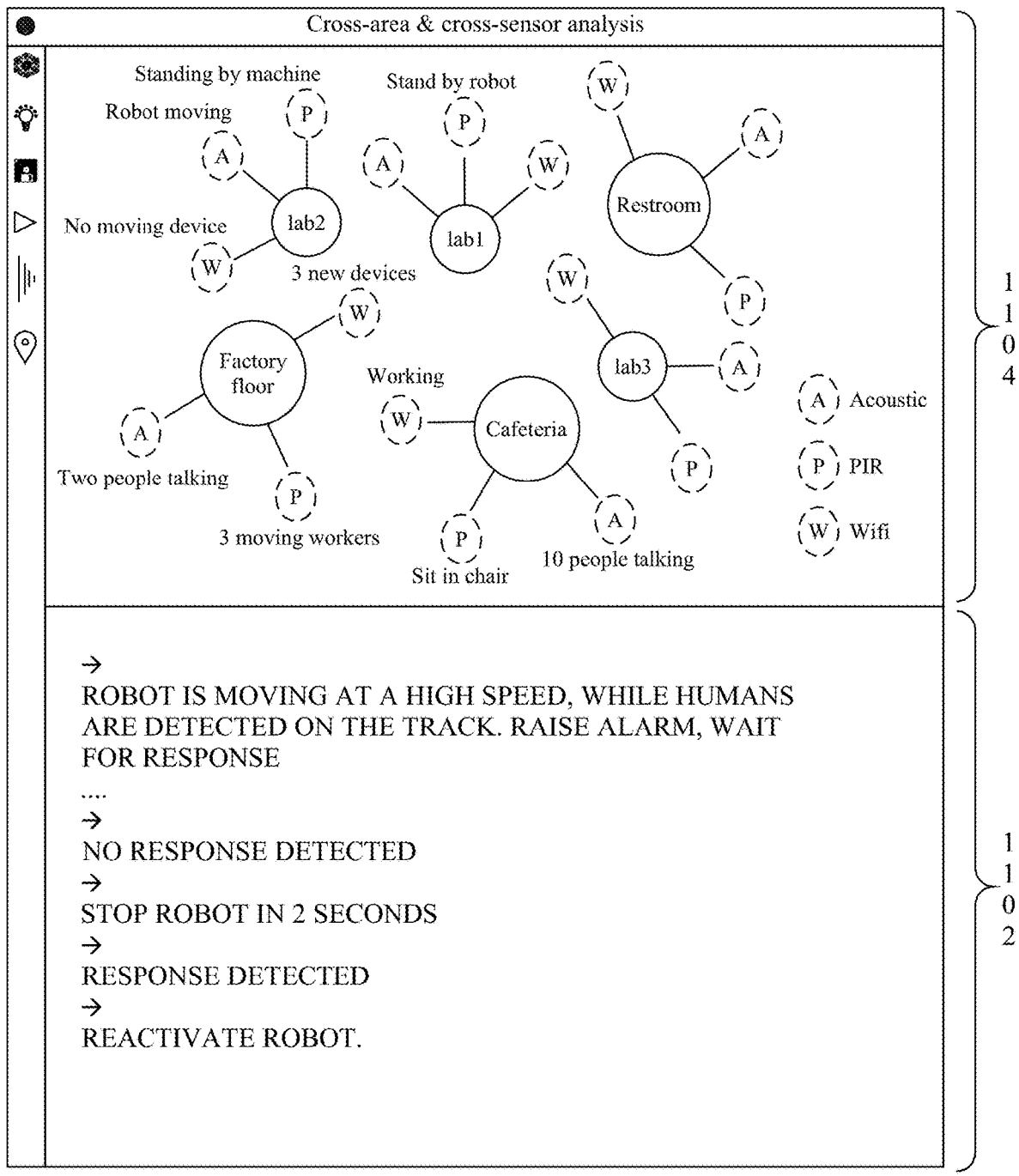
FIG. 11 illustrates an example user interface depicting cross-area activity inference.

FIG. 11 illustrates an example user interface 1100 depicting cross-area activity inference, according to various embodiments. As shown, another potential alert by the system may include a list 1102 of inferences and actions taken by the system. In addition, the system may also list a graphic 1104 that depicts the different areas of a location, the activities occurring in those locations, as well as the types of sensor data ingested by the system from those areas.

Figure 12:
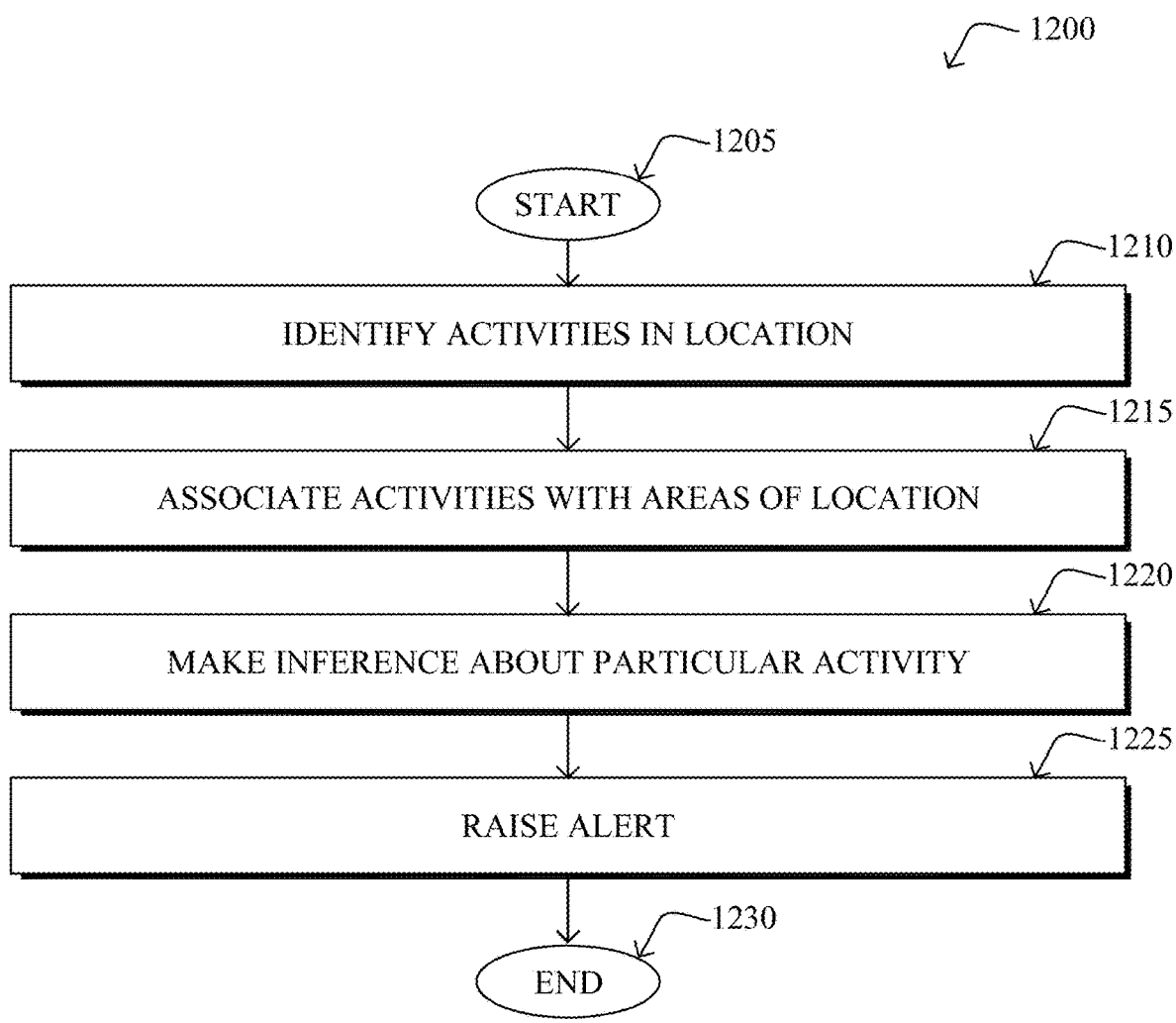
FIG. 12 illustrates an example simplified procedure for semantic reasoning-based environment learning for activity insights.

FIG. 12 illustrates an example simplified procedure (e.g., a method) for semantic reasoning-based environment learning for activity insights, in accordance with one or more embodiments described herein. For example, a non-generic, specifically configured device (e.g., device 200) may perform procedure 1200 by executing stored instructions (e.g., DFRE process 248). The procedure 1200 may start at step 1205, and continues to step 1210, where, as described in greater detail above, the device may identify, using a semantic reasoning engine, activities in a location, based on sensor data obtained from a plurality of sensors deployed to the locations. For instance, such sensor data may include at least one of: video data, passive infrared (PIR) data, or vibration sensor data. In one embodiment, the semantic reasoning engine uses concepts stored in a knowledge base to identify the activities in the location.

At step 1215, as detailed above, the device may associate the activities with areas of the location in which they occurred. In general, the device may do so by identifying the area in which the sensor(s) are located whose sensor data was used to identify a given activity and associating that activity with that area. In one embodiment, the device may do so in part by generating a heatmap of the location having intensities that represent frequencies of the activities occurring in the areas of the location. Such a heatmap may also be provided for display, allowing a user to review the activities in the various areas of the location.

At step 1220, the device may make using the semantic reasoning engine, an inference about a particular activity, based in part on where that activity occurred, as described in greater detail above. In one embodiment, the device may do so by computing probabilities of the activities transitioning across areas of the location, with the inference being based in part on those probabilities. In another embodiment, the inference may include a predicted event (e.g., a worker getting hurt, another activity occurring, etc.).

At step 1225, as detailed above, the device may raise, based on the inference, an alert regarding the particular activity. In one embodiment, the device raises the alert to a mobile device of a person at the location. In another embodiment, the alert regarding the particular activity comprises a control command for a robot. In a further embodiment, the alert may comprise a corrective measure that is reasoned by the semantic reasoning engine to avoid the predicted event. Procedure 1200 then ends at step 1230.

It should be noted that while certain steps within procedure 1200 may be optional as described above, the steps shown in FIG. 12 are merely examples for illustration, and certain other steps may be included or excluded as desired.

Further, while a particular order of the steps is shown, this ordering is merely illustrative, and any suitable arrangement of the steps may be utilized without departing from the scope of the embodiments herein.

While there have been shown and described illustrative embodiments that provide for semantic reasoning-based environmental learning for activity insights, it is to be understood that various other adaptations and modifications may be made within the spirit and scope of the embodiments herein. For example, while certain embodiments are described herein with respect to specific types of sensor systems, the techniques can be extended without undue experimentation to other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   identifying, by a device and using a semantic reasoning engine that accesses a knowledge base of semantic concepts, activities in a location that comprises an observed environment subdivided into defined areas, based on sensor data obtained from a plurality of sensors deployed to the location, wherein the sensor data is multimodal sensor data gathered from different types of sensors;
   associating, by the device, the activities with respective ones of the defined areas in which they occurred;
   computing, by the device, probabilities of the activities transitioning across the defined areas of the location based on learned temporal patterns;
   making, by the device and using the semantic reasoning engine, an inference about a particular activity, based in part on a particular defined area in which that activity occurred and the probabilities of the activities transitioning across the defined areas of the location; and
   raising, by the device and based on the inference, an alert regarding the particular activity.

2. The method as in claim 1, wherein the device raises the alert to a mobile device of a person at the location.

3. The method as in claim 1, wherein the alert regarding the particular activity comprises a control command for a robot.

4. The method as in claim 1, wherein the inference comprises a predicted event.

5. The method as in claim 4, wherein the alert comprises a corrective measure that is reasoned by the semantic reasoning engine to avoid the predicted event.

6. The method as in claim 1, wherein associating the activities with areas of the location in which they occurred comprises:
   generating a heatmap of the location having intensities that represent frequencies of the activities occurring in the areas of the location.

7. The method as in claim 6, further comprising:
   providing the heatmap for display.

8. The method as in claim 1, wherein the different types of sensors comprise a sensor that senses video data, passive infrared (PIR) data, or vibration sensor data.

9. An apparatus, comprising:
   a network interface to communicate with a computer network;
   a processor coupled to the network interface and configured to execute one or more processes; and
   a memory configured to store a process that is executed by the processor, the process when executed configured to:
      identify, using a semantic reasoning engine that accesses a knowledge base of semantic concepts, activities in a location that comprises an observed environment subdivided into defined areas, based on sensor data obtained from a plurality of sensors deployed to the location, wherein the sensor data is multimodal sensor data gathered from different types of sensors;
      associate the activities with respective ones of the defined areas in which they occurred;
      compute probabilities of the activities transitioning across the defined areas of the location based on learned temporal patterns;
      make, using the semantic reasoning engine, an inference about a particular activity, based in part on a particular defined area in which that activity occurred and the probabilities of the activities transitioning across the defined areas of the location; and
      raise, based on the inference, an alert regarding the particular activity.

10. The apparatus as in claim 9, wherein the apparatus raises the alert to a mobile device of a person at the location.

11. The apparatus as in claim 9, wherein the alert regarding the particular activity comprises a control command for a robot.

12. The apparatus as in claim 9, wherein the inference comprises a predicted event.

13. The apparatus as in claim 12, wherein the alert comprises a corrective measure that is reasoned by the semantic reasoning engine to avoid the predicted event.

14. The apparatus as in claim 9, wherein the apparatus associates the activities with areas of the location in which they occurred by:
   generating a heatmap of the location having intensities that represent frequencies of the activities occurring in the areas of the location.

15. The apparatus as in claim 14, wherein the process when executed is further configured to:
   provide the heatmap for display.

16. A tangible, non-transitory, computer-readable medium storing program instructions that cause a device to execute a process comprising:
   identifying, by the device and using a semantic reasoning engine that accesses a knowledge base of semantic concepts, activities in a location that comprises an observed environment subdivided into defined areas, based on sensor data obtained from a plurality of sensors deployed to the location, wherein the sensor data is multimodal sensor data gathered from different types of sensors;
   associating, by the device, the activities with respective ones of the defined areas in which they occurred;
   computing, by the device, probabilities of the activities transitioning across the defined areas of the location based on learned temporal patterns;

making, by the device and using the semantic reasoning engine, an inference about a particular activity, based in part on a particular defined area in which that activity occurred and the probabilities of the activities transitioning across the defined areas of the location; and raising, by the device and based on the inference, an alert regarding the particular activity.

17. The apparatus as in claim 9, wherein the different types of sensors comprise a sensor that senses video data, passive infrared (PIR) data, or vibration sensor data.

18. The tangible, non-transitory, computer-readable medium as in claim 16, wherein the different types of sensors comprise a sensor that senses video data, passive infrared (PIR) data, or vibration sensor data.

* * * * *